US008752978B2

(12) United States Patent
Bloom et al.

(10) Patent No.: US 8,752,978 B2
(45) Date of Patent: Jun. 17, 2014

(54) LED RETROFIT LUMINAIRE TUBES

(75) Inventors: John R. Bloom, Seattle, WA (US);
Walter M. Bloom, Jr., Warminster, PA
(US); Craig S. Cressman, Blackwood,
NJ (US); Richard A. Frantz, Hatboro,
PA (US); Daniel J. Clark, Glenside, PA
(US)

(73) Assignee: Keystone L.E.D. Holdings LLC,
Warminster, PA (US)

( * ) Notice: Subject to any disclaimer, the term of this
patent is extended or adjusted under 35
U.S.C. 154(b) by 52 days.

(21) Appl. No.: 13/212,146

(22) Filed: Aug. 17, 2011

(65) Prior Publication Data

US 2012/0212953 A1  Aug. 23, 2012

Related U.S. Application Data

(60) Provisional application No. 61/374,587, filed on Aug. 17, 2010.

(51) Int. Cl.
*F21S 4/00* (2006.01)
*F21V 21/30* (2006.01)
*F21V 15/01* (2006.01)

(52) U.S. Cl.
USPC ............. 362/223; 362/249.02; 362/249.03

(58) Field of Classification Search
USPC .......... 362/217.05, 223, 224, 249.02, 249.03,
362/238, 555, 311.02, 249.01
See application file for complete search history.

(56) References Cited

U.S. PATENT DOCUMENTS

| 5,622,423 | A  | * | 4/1997  | Lee            | 362/186   |
|-----------|----|---|---------|----------------|-----------|
| 6,305,109 | B1 | * | 10/2001 | Lee            | 40/546    |
| 6,561,690 | B2 | * | 5/2003  | Balestriero et al. | 362/555 |
| 6,851,837 | B2 | * | 2/2005  | Tessnow et al. | 362/362   |
| 6,853,151 | B2 | * | 2/2005  | Leong et al.   | 315/185 R |
| 6,936,968 | B2 | * | 8/2005  | Cross et al.   | 315/74    |
| 7,635,201 | B2 | * | 12/2009 | Deng           | 362/249.02|
| 7,810,955 | B2 | * | 10/2010 | Stimac et al.  | 362/294   |
| 7,954,979 | B2 | * | 6/2011  | Sommers et al. | 362/217.01|
| 7,976,196 | B2 | * | 7/2011  | Ivey et al.    | 362/294   |
| 8,104,920 | B2 | * | 1/2012  | Dubord         | 362/217.12|
| 8,157,408 | B2 | * | 4/2012  | Yang et al.    | 362/217.13|
| 8,232,724 | B2 | * | 7/2012  | Mostoller et al. | 313/512 |
| 8,408,734 | B2 | * | 4/2013  | Wu et al.      | 362/218   |
| 8,425,085 | B2 | * | 4/2013  | Van Laanen et al. | 362/294 |
| 2011/0141724 | A1 | * | 6/2011 | Erion         | 362/218   |

* cited by examiner

*Primary Examiner* — Alan Cariaso
(74) *Attorney, Agent, or Firm* — Douglas J. Ryder; Ryder, Lu, Mazzeo & Konieczny LLC (57) ABSTRACT

An LED retrofit tube that has an outer body that is substantially a lens so as to enable light generated by LEDs and light reflected therewithin to pass through substantially the entire tube. The tube includes an extrusion to support a circuit board having light emitting diodes (LEDs) mounted thereto. The extrusion is located substantially with the lens. The circuit boards may include LEDs mounted on both sides to provide primary lighting and secondary lighting (backlighting). The extrusion may include grooves to allow the backlighting to pass therethrough. Rotational endcaps include an inner portion and an outer portion that can rotate with respect to one another to enable the tube to be rotated and the light dispersed therefrom to be focused.

20 Claims, 7 Drawing Sheets

LED RETROFIT LUMINAIRE TUBES

PRIORITY

This application claims the priority under 35 USC §119 of Provisional Application 61/374,587 entitled "Light Emitting Diode (LED) Tube and Power Supply for T8 Light Fixtures" filed on Aug. 17, 2010. Application 61/374,587 is herein incorporated by reference in its entirety but is not prior art.

BACKGROUND

Light emitting diodes (LEDs) are an efficient source of light. By utilizing a plurality of LEDs in a defined arrangement, the LEDs may be utilized to provide an alternative to current luminaires, such as incandescent bulbs and fluorescent tubes. In order for LED luminaires (e.g., bulbs, tubes, fixtures) to be widely adapted they need to be able to replace current luminaires (e.g., incandescent bulbs, fluorescent tubes) in existing lighting configurations (e.g., troffers).

Figure 1:
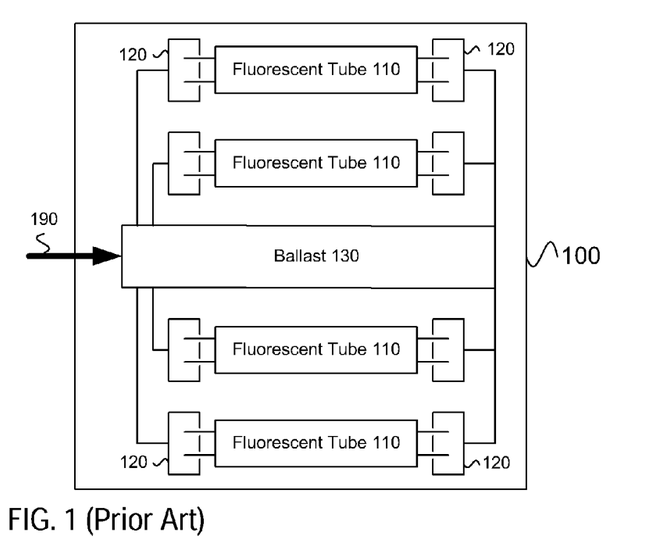
FIG. 1 illustrates a high level functional diagram of an example troffer commonly used to provide fluorescent lighting in commercial establishments.

FIG. 1 illustrates a high level functional diagram of an example troffer 100 commonly used to provide fluorescent lighting in commercial establishments (e.g., office buildings, retail stores, apartment complexes, hotels). The troffer 100 includes a housing (not separately identified in the figure) that is typically located in the ceiling and houses a plurality of fluorescent tubes 110 (four illustrated). The troffer 100 includes clips 120 that are utilized to hold the fluorescent tubes 110 and to provide the appropriate power thereto. The tubes 110 need a high initial voltage to begin operation (lighting) and then require a regulated current to operate. Accordingly, the troffer 100 includes a ballast 130 that receives the line power (e.g., 120V, 240V) 190 for the establishment and provides an initial striking voltage to the tubes 110 to initiate operation and then maintains a regulated current to the tubes 110. The troffer 110 includes wires incorporated therein (not illustrated) that connect the ballast 130 to the clips 120.

As illustrated, the ballast 130 is a single device connected to the plurality of fluorescent tubes 110 but is not limited thereto. Rather, multiple ballasts could be utilized with each ballast providing power to one or more fluorescent tubes 110.

A retrofitted LED tube needs to have the same, substantially the same, or similar footprint and form factor (hereinafter, for ease, simply referred to as same footprint) to be able to replace the florescent tube 110 in the troffer 100. However, the power requirements for an LED tube are different than the power requirements for florescent tubes 110. The ballast 130 used with florescent tubes 110 is not capable of providing the power requirements of the LED tubes and is typically removed, disconnected, or deactivated (simply referred to hereinafter as removed for convenience) in retrofits. A power supply/driver is required to convert the line power 190 to the appropriate power requirements of the LED tubes.

Often retrofit LED tubes use individualized power supplies built into each tube and each tube is directly connected to the line power 190. This may require the removal of the ballast 130 from the troffer 100. The LED tubes may be connected to the line power 190 via the clips 120 if, for example, the troffer 100 is modified so the wires incorporated therein that typically are used to connect the clips 120 to the ballast 130 are disconnected from the ballast 130 and are connected directly to the line power 190. Alternatively, the LED tubes may include connectors and/or wires extending therefrom for connecting directly to the line power 190.

Requiring the ballast 130 to be removed and connecting the line power 190 directly to the LED tubes adds to the labor costs of retrofitting the light troffers 100 with LED tubes. This operation may require skilled professionals (e.g., electricians) and may pose a safety hazard as contact with the line power 190 may occur. Furthermore having the line power 190 on the clips 120 may propose a hazard when the LED tubes are replaced as an installer may inadvertently contact the line power 190.

Moreover, encapsulating a power supply within a tube generates additional unnecessary heat that is trapped therewithin. This additional heat adversely affects the LEDs themselves, altering color temperature and shortening their expected lifespan. Moreover, the power supply may have a life span less then that of the LEDs and thus be the limiting factor in the life of the LED tubes.

Figure 2:
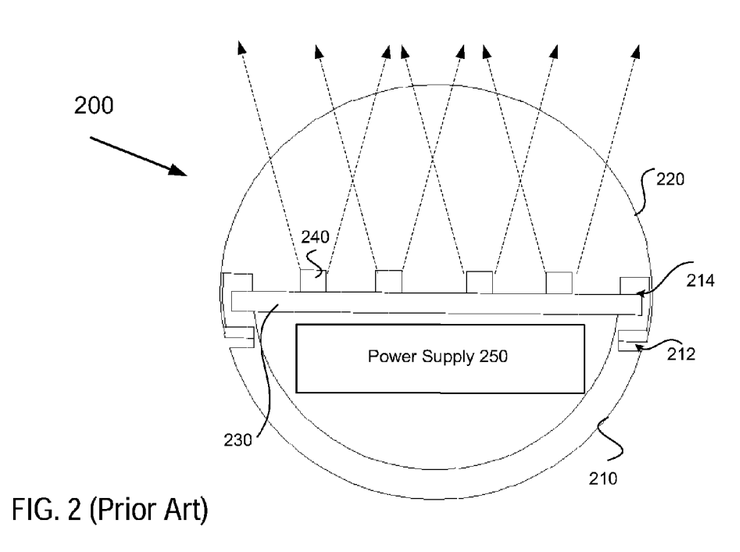
FIG. 2 illustrates a cross sectional view of an example LED tube commonly used as a replacement for fluorescent tubes.

FIG. 2 illustrates a cross sectional view of an example LED tube 200 commonly used as a replacement for fluorescent tubes. The tube 200 includes an extrusion 210, a lens 220, a circuit board 230 having LEDs 240 mounted thereon, and a power supply 250. The extrusion 210 is made of aluminum so that it may act as a heat sink for the board 230. The extrusion 210 is substantially semicircular so as to provide a bottom portion (approximately ½) of the body of the tube 200. The extrusion 210 may include a ledge, groove 214 formed in an inner surface and the board 230 may rest and be secured therewithin. The board 230 thus is located at approximately the middle of the tube 200 so that the power supply 250 can be located therebelow in the lower half of the tube 200. As the ledge 214 only provides support for the edges of the board 230, the board 230 is in effect floating in the middle of the tube 200. Because the extrusion 210 only contacts the outer edges of the board 230 at the ledge 214 the heat dissipated from the board 230 is limited (the extrusion 210 provides limited thermal management).

The lens 220 is substantially semicircular so as to provide a top portion (approximately ½) of the body of the tube 200. The extrusion 210 and the lens 220 connect together to form the outer body of the tube 200. The extrusion 210 may have a slot or grove 212 formed in an outer surface for receiving the lens 220, for example, a lip (not separately illustrated) formed in an outer edge of the lens 220. The lens 220 is acrylic or plastic.

The LEDs 240 on the board 230 may emit light in one direction, down and out at approximately 120 degrees. While this maximizes the LED light output, the result is that LED tubes provide light much more directionally then fluorescent tubes 110. The use of the extrusion 210 as part of the outer body of the tube 200 further limits how the light will be dispersed as no light will be able to exit therefrom. That is, any light, even light reflecting within the tube 200, is limited to exiting the lens 220 (approximately 180 degrees). Furthermore, the extrusion 210 prevents uplighting within the troffer (light illuminating the top of the troffer and/or reflecting therefrom). The result of the directional light provided by the LEDs 240 and the limited dispersion of light from the tube 200 may provide a reflective interior of the troffer that appears "dim", which not only creates an aesthetic distraction, but reduces lumen output.

Figure 3:
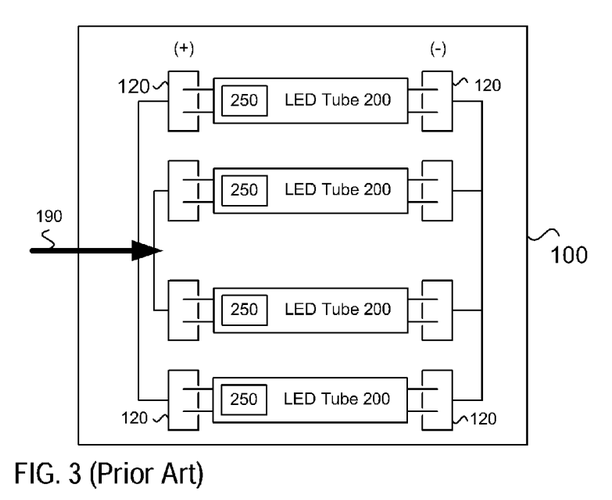
FIG. 3 illustrates a high level functional diagram of an example troffer commonly used when retrofitting example LED tubes having individualized power supplies therewithin.

FIG. 3 illustrates a high level functional diagram of an example troffer 100 commonly used when retrofitting example LED tubes 200 having individualized power supplies 250 therewithin. The ballast was removed and the line power 190 is connected directly the clips 120, the wires incorporated in the troffer 100 that typically connect the clips 120 to the ballast are instead connected directly to the line power 190.

BRIEF DESCRIPTION OF THE DRAWINGS

The features and advantages of the various embodiments will become apparent from the following detailed description in which.

DETAILED DESCRIPTION

The main objectives for retrofitting current luminaires (e.g., incandescent, fluorescent) with LED luminaires is to conserve power (and thus save money) and to make the transition as easy and inexpensive as possible. Aside from material costs for the LED luminaires and the necessary power supply, the end user must take installation labor into consideration.

Maintenance personnel who are familiar with the example troffers 100 are used to installing and/or replacing fluorescent tubes 110 without needing to worry about possible inadvertent contact with the line power 190 that is possible with LED tubes 200 having power supplies 250 included therewithin. Removing the power supply from the LED tubes and utilizing an external power supply to receive the line power 190 and convert the line power 190 to the appropriate power required to operate the LED tubes may eliminate this worry and make installation and/or replacement of LED tubes similar to what the maintenance personnel are familiar with and ease the transition thereto.

Maintenance personnel who are familiar with the example troffers 100 are also familiar with installing and/or replacing ballasts 130. Retrofitting an external power supply in place of a ballast 130 may be a similar task for maintenance personnel in that they may connect the power supply to the line power 190 and the clips 120 (or wires within the troffer 100 connecting to the clips 120) just like they do with the ballast 130.

Designing the external power supply to have the same, substantially the same, or similar footprint and form factor (hereinafter, for ease, simply referred to as same footprint) as the ballast 130 may enable the power supply to be installed in the same or similar location in the troffer 100 and in the same or similar fashion. The power supply may have the same or similar input/output connections (e.g., same number and type of wires) to connect to the line power 190 and the clips 120 (or wires within the troffer 100 connecting to the clips 120) in the same or similar manner. The same footprint power supply may enable retrofitting with no, or substantially no, additional training or equipment required as it becomes intuitive and quick for the personnel (e.g., electrician) doing the job.

Figure 4:
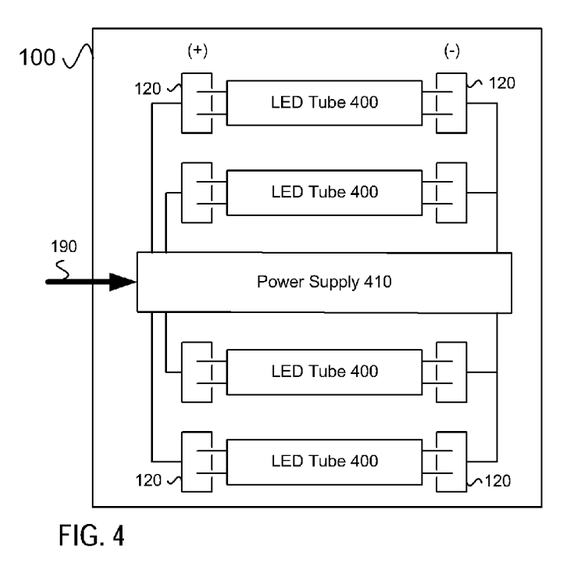
FIG. 4 illustrates a high level functional diagram of an example troffer used when retrofitting LED tubes and an external power supply, according to one embodiment.

FIG. 4 illustrates a high level functional diagram of an example troffer 100 used when retrofitting LED tubes (without internal power supplies) 400 and an external power supply (electronic switching) 410. The power supply 410 is installed in place of the ballast 130 and receives the line power 190 from the power grid for the establishment (e.g., office building) and converts the line power 190 to the appropriate power required to operate the LED tubes 400. The power supply 410 provides the appropriate power to the clips 120 and the LED tubes 400 receive the appropriate power therefrom.

As illustrated, the external power supply 410 is a single device connected to the plurality of LED tubes 400 but is not limited thereto. Rather, multiple external power supplies could be utilized with each external power supply providing power to one or more LED tubes 400. The power supply could be a one for one replacement for each ballast that may have originally been included in the troffer 100 but is not limited thereto. Rather, multiple external power supplies could be utilized to replace the ballast (or each ballast) or an external power supply (or each external power supply) could replace multiple ballasts.

By removing the power supply from an LED tube the bottom of the tube that was reserved therefore can be used to provide an extrusion to hold the board and provide heatsinking therefore. By locating the extrusion within the tube it need not be used as part of the outer surface of the tube and the lens can become a more significant portion of the outer body. Such a configuration provides an LED tube with a wider range for light to be emitted therefrom. Furthermore, an outer body of the tube that is significantly a lens is more like a typical fluorescent tube.

Figure 5:
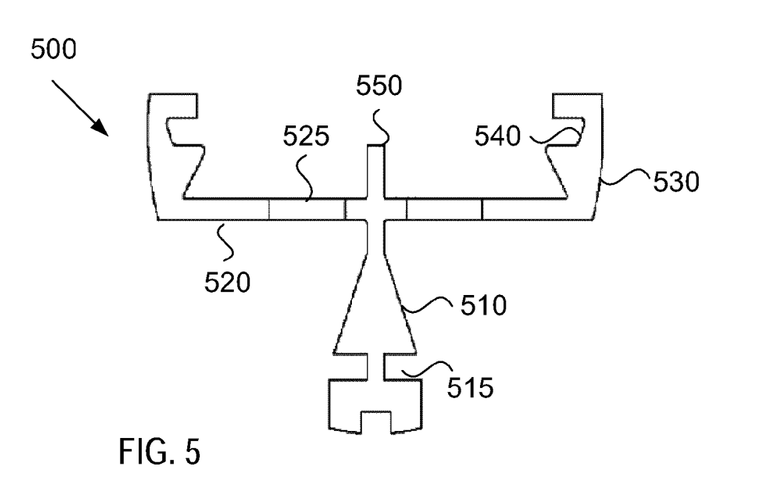
FIG. 5 illustrates a side view of an example extrusion used to hold one or more LED circuit boards and to provide heat sinking thereto, according to one embodiment.

FIG. 5 illustrates a side view of an example extrusion 500 used to hold one or more LED circuit boards and to provide heat sinking thereto. The extrusion 500 may be made of a material (e.g., aluminum) capable of wicking heat away from the one or more LED boards. The extrusion 500 may be T-shaped and include a base 510 supporting a platform 520. The platform 520 may have rails (arms) 530 extending upwards at the edges. These edge rails 530 may have channels (fingers) 540 formed therein. The one or more LED circuit boards may be secured to the extrusion 500 in the channels 540. The channels 540 touch the top and bottom surface of the board(s) thus providing heat sinking from both surfaces. The extrusion 500 may include an additional rail (or rails) 550 in the center of the extrusion 500 to provide additional support for the board(s) as well as to provide heat sinking from the middle of the board(s). The base 510 may get wider as it extends from the platform 520 to enable additional heat to be wicked away from the board(s). The base 510 may include grooves 515 formed therein to allow a lens to be connected thereto.

Figure 6:
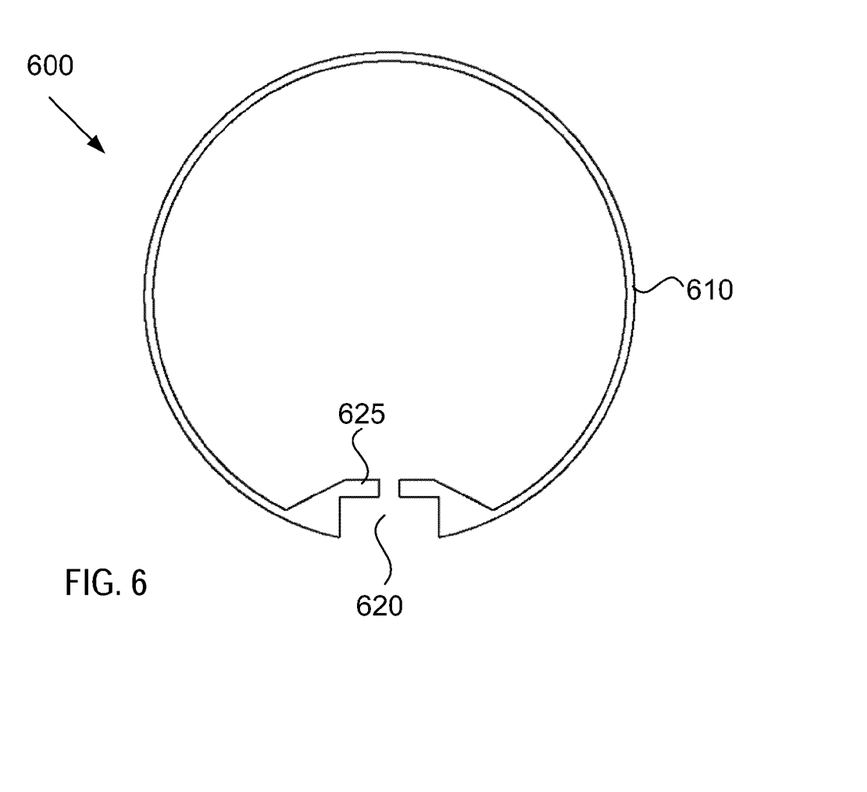
FIG. 6 illustrates a side view of an example outer body of an LED tube, according to one embodiment.

FIG. 6 illustrates a side view of an example outer body 600 of an LED tube. The outer body 600 includes a lens 610 that is nearly a complete circle (approximately 300 degrees). The lens 610 may be made of a material (e.g., acrylic, plastic) capable of allowing light to emit therefrom. The outer body 600 may include a connection means 620 capable of connecting to an extrusion (e.g., 500 of FIG. 5). The connection means 620 may extend into the inner portion of the outer body 600 and include fingers 625 to connect to the extrusion (e.g., grooves 515 of FIG. 5).

While the outer body 600 enables light to be emitted from a large portion thereof (the lens 610), the light being emitted from the lower portion (below where an LED board would be mounted) is limited to light that may be reflected within the tube. While this may provide a wider dispersion of light and may reduce the "dim" reflective interior appearance of a troffer, the benefit is limited. In order to take advantage of the approximately 300 degree lens 610, an arrangement may be used that has LEDs arranged in such a fashion that light is emitted in multiple directions. For example, LED circuit boards may include LEDs on an upper and lower surface or different LED circuit boards could face different directions.

Figure 7:
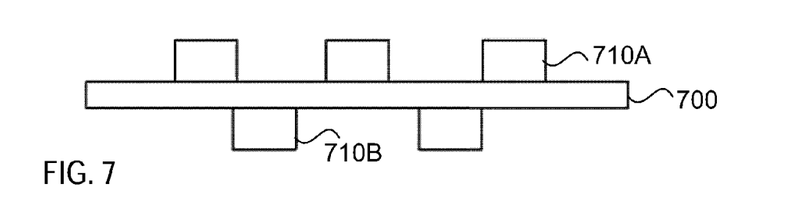
FIG. 7 illustrates an example LED circuit board having LEDs formed on an upper surface and LEDs formed on a lower surface thereof, according to one embodiment.

FIG. 7 illustrates an example LED circuit board 700 having LEDs 710A formed on an upper surface and LEDs 710B formed on a lower surface thereof. The LEDs 710A, 710B may be the same type or may be different. The board 700 may include more LEDs 710A as these LEDs provide the primary lighting while the LEDs 710B provide secondary lighting (e.g., backlighting).

Figure 8:
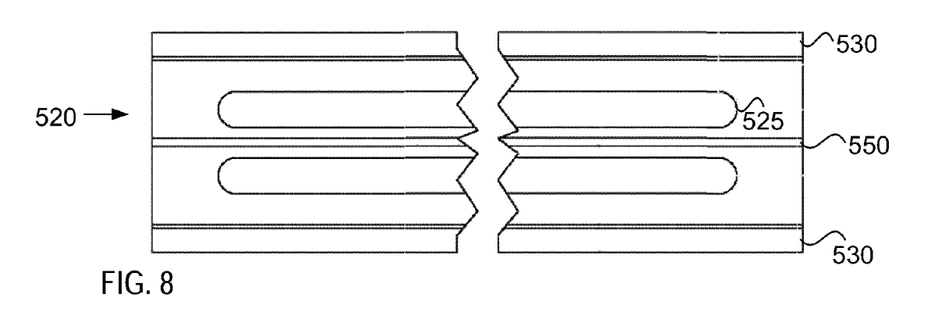
FIG. 8 illustrates an upper view of a platform of an example extrusion, according to one embodiment.

Referring back to FIG. 5, the extrusion 500 may have grooves 525 formed in the platform 520 and these grooves 525 may enable light from LEDs 710B to pass therethrough and thus be emitted out of the lower portion of the lens 610. FIG. 8 illustrates an upper view of the platform 520 of the example extrusion 500. The platform 520 includes edge rails (arms) 530, center rail 550 and grooves 525.

Figure 9:
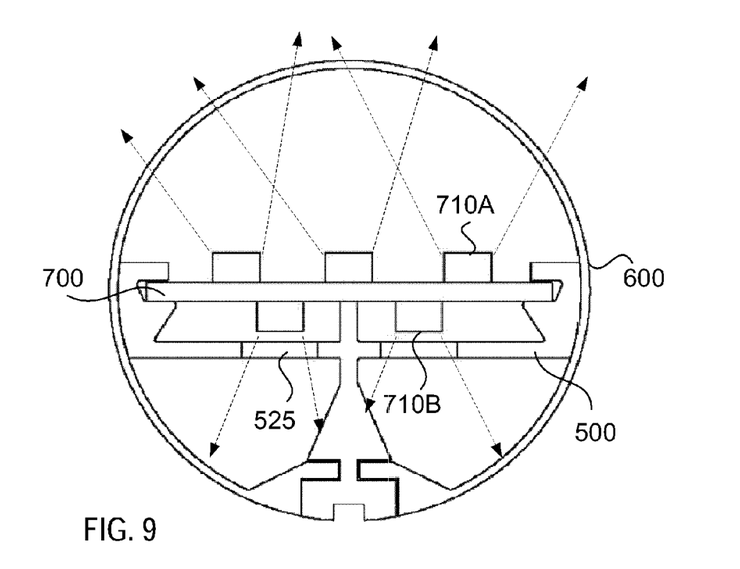
FIG. 9 illustrates a side view of an example LED tube, according to one embodiment.

FIG. 9 illustrates a side view of an example LED tube 900. The tube 900 includes the extrusion 500, the outer body 600 and the board 700. The LEDs 710A emit light out the upper portion of the tube 900 and the LEDs 710B emit light through the grooves 525 and out the lower portion of the tube 900.

It should be noted that only a single board 700 is visible in the side view of the tube 900 but the tube 900 may include multiple boards connected together. For example, a standard board may be two feet so that a single board may be used for a 2 foot tube and two boards may be included for a four foot tube.

The emitting of light in multiple directions is not limited to the arrangements illustrated and described in FIGS. 5-9. For example, rather then using a multisided board (LEDs on both sides) multiple boards could be used. One board (main board) could face the LEDs in the direction light is to be provided (upper portion of tube) while the other board could face the LEDs the opposite direction for backlighting (lower portion of tube). The extrusion could include two sets of channels (fingers) with an upper set holding a board so the LEDs face the upper portion of the tube and a lower set holding a board so the LEDs face the lower portion of the tube. The extrusion could hold one ore more of the boards at angles rather than horizontally as illustrated. The angled boards could disperse the main lighting and/or secondary lighting (e.g., backlighting) at a wider range.

The limited beam spread of LED tubes restricts the product in terms of certain applications. For example, stairwells and wall mounted applications pose problems since the directed light of LED tubes may not be directed in all needed areas. Allowing an LED tube to rotate within the troffer (or other housing) would enable a user the ability to "focus" the light emitted therefrom to where it may be needed. One way to enable rotation of the tube while the tube is in its housing is to enable the endcaps (portion of tube that utilizes pins to connect the tube to the clips and receives power from therefrom and provides the power to the boards therewithin) to rotate in some fashion. The rotational endcaps may include an inner and outer portion that rotate with relation to each other. The endcaps may be secured in a set position and require some force to rotate them with respect to each other so that the tube is not free to rotate all the time. The rotation may be in a single direction or both directions.

Figure 10:
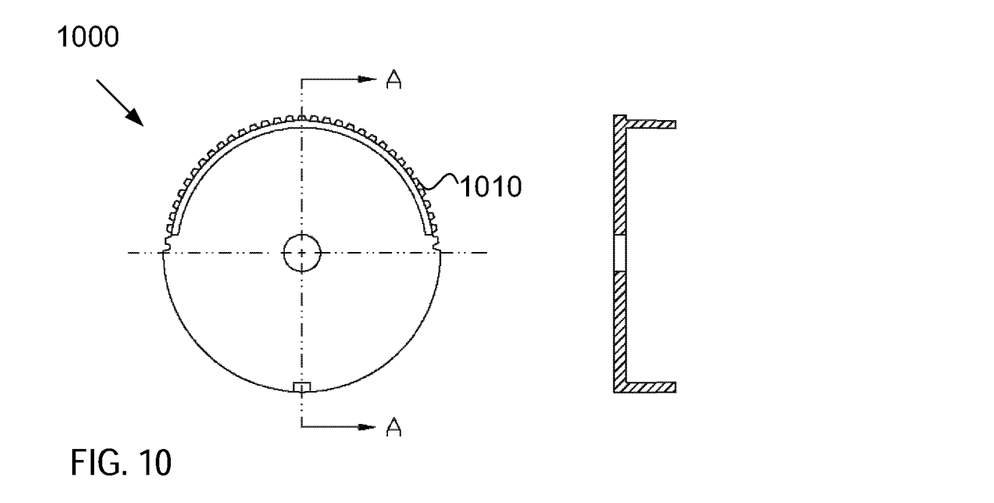
FIG. 10 illustrates a side view of an example inner portion of an endcap, according to one embodiment.

FIG. 10 illustrates a side view of an example inner portion 1000 of an endcap. The inner portion 1000 may include teeth 1010 formed on an outer edge thereof. While not illustrated the pins for connecting the tube to the clips and receiving power via the clips would protrude therefrom.

Figure 11:
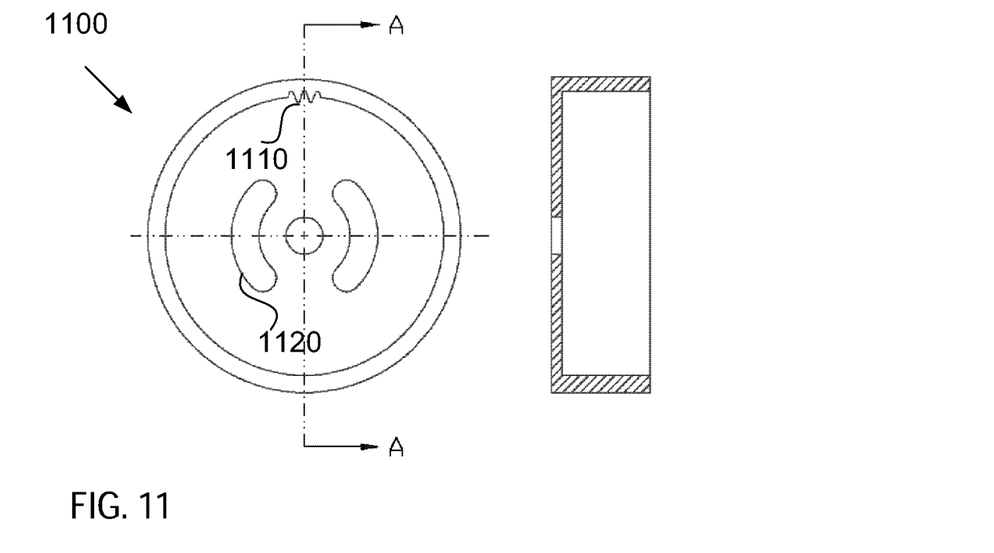
FIG. 11 illustrates a side view of an example outer portion of an endcap, according to one embodiment.

FIG. 11 illustrates a side view of an example outer portion 1100 of an endcap. The outer portion 1000 may include teeth 1110 formed on an inner edge thereof. The outer portion 1100 may include grooves 1120 formed therein that allow the pins to protrude therethrough and to be rotated therewithin.

Figure 12A:
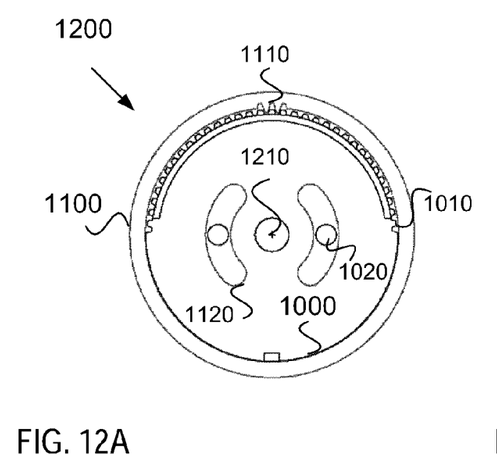
FIGS. 12A-C illustrate several views of an example rotational endcap, according to one embodiment.
Figure 12B:
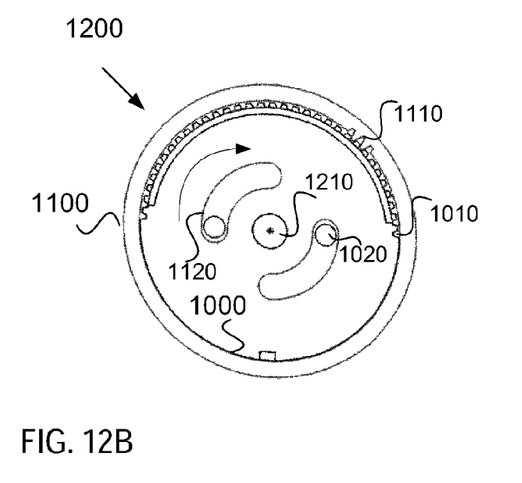
Figure 12C:
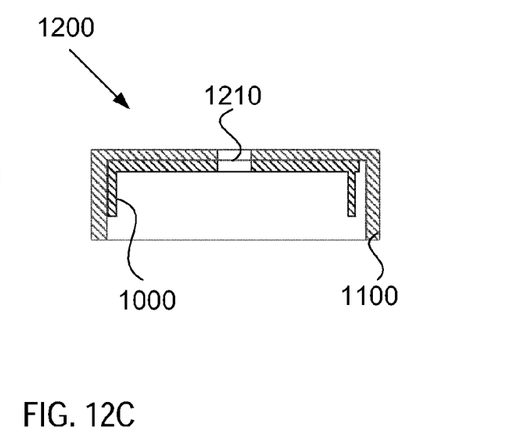

FIGS. 12A-C illustrate several views of an example rotational endcap 1200. FIG. 12C illustrates a cross sectional view showing the inner portion 1000 within the outer portion 1100. The two portions may be rotationally connected together with a rivet 1210 or the like. FIGS. 12A-B illustrate side views of the example endcap 1200 with the pins 1020 within the grooves 1120, the sets of teeth 1010, 1110 interconnected, and the rivet 1210 rotatably securing the endcaps 1000, 1100.

FIG. 12A illustrates the example endcap 1200 in a normal (centered) position. That is, the pins 1020 from the inner endcap 1000 are centered within the grooves 1120 of the outer endcap 1100 and the teeth 1110 of the outer endcap 1100 are centered over the teeth 1010 of the inner endcap 1000.

FIG. 12B illustrates example endcap 1200 in a rotated position, where the outer endcap 1100 has been rotated to the right with respect to the inner endcap 1000. The left pin 1020 is now located at a lower edge of the left groove 1120, the right pin 1020 is now located at an upper edge of the right grove 1120, and the teeth 1110 of the outer endcap 1100 are over a right portion of the teeth 1010 of the inner endcap 1000. As illustrated, the endcaps 1200 provide approximately 45 degrees of rotation in either direction. The amount of rotation is not limited thereto. The outer endcap 1100 may be connected to the body of the tube and the contents (e.g., circuit board containing LEDs) contained therein so that when the outer endcap 1100 is rotated around the inner endcap 1000 the contents of the tube is rotated as well. This enables the light being generated by the LEDs to be focused in different directions.

It should be noted that the rotational endcap is not limited to the embodiments illustrated in and described in FIGS. 10-12. Various different designs could be utilized to provide the ability to "focus" the light emitted from a LED tube to where it may be needed. For example, the inner endcap could have the smaller amount of teeth that rotated with respect to a larger amount of teeth in the outer endcap. The teeth on the inner endcap could be on an inner edge and the teeth on the outer endcap could be on an outer edge. Teeth may not be required as the grooves on the outer endcap could have positions with which the pins could be locked within.

The rotational endcaps may be used with various different LED tubes. For example, the rotational endcaps could be used with LED tubes where the extrusion is part of the outside body such as that illustrated in FIG. 2. The rotational endcaps may also be used with LED tubes having the lens as a substantial portion of the outside body such as that illustrated in FIG. 9 (whether the tube is designed to disperse light in just a main direction, a main direction and a secondary direction, or multiple directions).

Figure 13A:
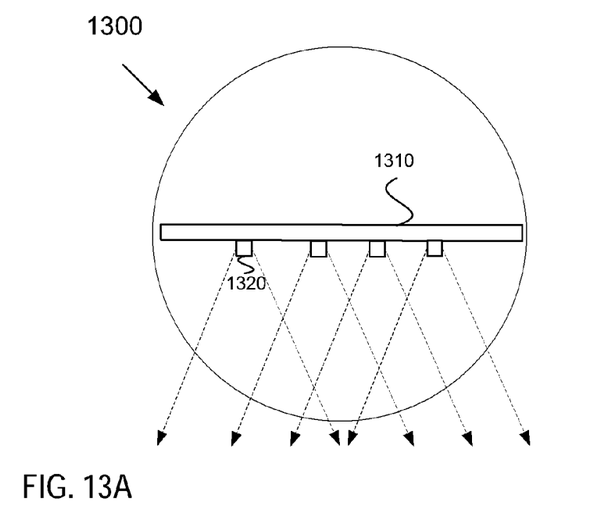
FIGS. 13A-B illustrate an example LED tube prior to and after rotation, according to one embodiment.
Figure 13B:
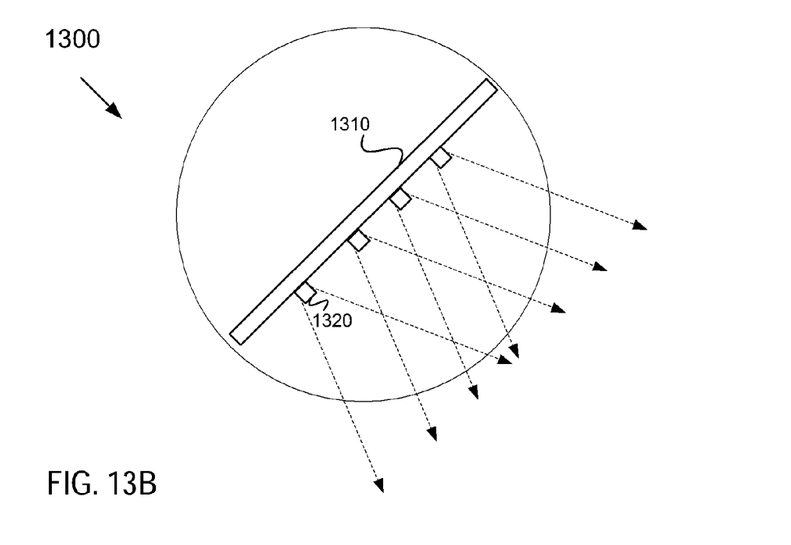

FIGS. 13A-B illustrate an example LED tube 1300 prior to and after rotation. The tube 1300 includes a board 1310 having LEDs mounted thereto. As illustrated, the LEDs 1310 are mounted so as to direct light in a single (main) direction. FIG.

13A illustrates the tube 1300 prior to rotation where the light is directed down. FIG. 13B illustrates the tube 1300 after it is rotated to the right so that the light is directed downward but at an angle. Rotating the focus of the light may enable the LED tube 1300 to be used in different situations where the focus of light is not downward (for example, on a picture mounted to a wall).

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An LED retrofitted tube comprising
a lens that is substantially circular and makes up substantially an outer body of the tube; and
an extrusion to hold a circuit board housing light emitting diodes (LEDs), where the extrusion is located substantially within the lens, wherein the circuit board includes LEDs mounted on both sides, the LEDs mounted on a first side point away from the extrusion and the LEDs on a second side face the extrusion, wherein the extrusion includes grooves formed in alignment with the LEDs on the second side of the circuit board to enable light emitted therefrom to pass therethrough.

2. The tube of claim 1, wherein light emitted from the LEDs and reflected within the tube can be dispersed from the tube through any portion of the lens.

3. The tube of claim 1, wherein the extrusion includes channels to support the edges of the circuit board.

4. The tube of claim 3, wherein the extrusion includes a center portion to provide support and heat sinking for the circuit board.

5. The tube of claim 1, wherein the extrusion is T-shaped and includes a base supporting a platform.

6. The tube of claim 5, wherein the lens connects to the base of the extrusion.

7. The tube of claim 5, wherein the platform includes rails extending upwards at the edges that have channels formed therein for securing the circuit board.

8. The tube of claim 7, wherein the platform further includes a center rail to provide additional support for the circuit board and to provide heat sinking from the middle of the circuit board.

9. The tube of claim 1, wherein the circuit board receives power from an external power supply.

10. The tube of claim 1, further comprising endcaps that have an inner portion and an outer portion, wherein the inner and outer portions can rotate with respect to one another in order to focus light emitted from the LEDs.

11. An LED retrofitted tube comprising
a lens that is substantially circular and makes up substantially an outer body of the tube; and
an extrusion to hold a circuit board housing light emitting diodes (LEDs), wherein the extrusion is located substantially within the lens, wherein the extrusion is T-shaped and includes a base supporting a platform, wherein the circuit board includes LEDs mounted on both sides, the LEDs mounted on a first side point away from the platform and the LEDs on a second side face the platform, wherein the platform includes grooves formed in alignment with the LEDs on the second side of the circuit board to enable light emitted therefrom to pass therethrough.

12. The tube of claim 11, wherein the lens connects to the base of the extrusion.

13. The tube of claim 11, wherein the platform includes rails extending upwards at the edges that have channels formed therein for securing the circuit board.

14. The tube of claim 13, wherein the platform further includes a center rail to provide additional support for the circuit board and to provide heat sinking from the middle of the circuit board.

15. The tube of claim 11, further comprising endcaps that have an inner portion and an outer portion, wherein the inner and outer portions can rotate with respect to one another in order to focus light emitted from the LEDs.

16. An LED retrofitted tube comprising
a lens that is substantially circular and makes up substantially an outer body of the tube; and
an extrusion to hold a circuit board housing light emitting diodes (LEDs), wherein the extrusion is located substantially within the lens, wherein the extrusion is T-shaped and includes a base supporting a platform, wherein the platform includes rails extending upwards at the edges that have channels formed therein for securing the circuit board and a center rail to provide additional support for the circuit board and to provide heat sinking from the middle of the circuit board.

17. The tube of claim 16, wherein the lens connects to the base of the extrusion.

18. The tube of claim 16, wherein the circuit board includes LEDs mounted on both sides, the LEDs mounted on a first side point away from the platform and the LEDs on a second side face the platform, wherein the platform includes grooves formed in alignment with the LEDs on the second side of the circuit board to enable light emitted therefrom to pass therethrough.

19. The tube of claim 16, wherein the circuit board receives power from an external power supply.

20. The tube of claim 16, further comprising endcaps that have an inner portion and an outer portion, wherein the inner and outer portions can rotate with respect to one another in order to focus light emitted from the LEDs.

* * * * *